United States Patent [19]

Karakama

[11] Patent Number: 4,633,666

[45] Date of Patent: Jan. 6, 1987

[54] INTEGRATED HYDRAULIC SYSTEM

[75] Inventor: Tadao Karakama, Kawasaki, Japan

[73] Assignee: Kabushiki Kaisha Komatsu Seisakusho, Tokyo, Japan

[21] Appl. No.: 653,741

[22] Filed: Sep. 24, 1984

[30] Foreign Application Priority Data

Sep. 22, 1983 [JP] Japan .......................... 58-145945[U]

[51] Int. Cl.$^4$ .............................................. F16D 31/02

[52] U.S. Cl. .......................................... 60/421; 60/422

[58] Field of Search .................................. 60/421, 422

[56] References Cited

U.S. PATENT DOCUMENTS

| | | | |
|---|---|---|---|
| 2,979,908 | 4/1961 | Shook | 60/421 |
| 3,355,994 | 12/1967 | Malott | 91/412 |
| 4,023,364 | 5/1977 | Bianchetta | 60/421 |
| 4,073,141 | 2/1978 | Lohbauer | 60/421 |
| 4,321,793 | 3/1982 | Uranaka et al. | 60/422 |
| 4,422,290 | 12/1983 | Huffman | 60/422 |

FOREIGN PATENT DOCUMENTS 57-11476 7/1981 Japan .

*Primary Examiner*—A. Michael Chambers

*Attorney, Agent, or Firm*—Armstrong, Nikaido, Marmelstein & Kubovcik

[57] ABSTRACT

An integrated hydraulic system for use in a construction work vehicle has three hydraulic pumps for supplying hydraulic fluid into a steering mechanism and work implement operating actuators. One of the pumps is a steering pump for supplying through a steering circuit hydraulic fluid into the steering mechanism. Another pump is a work implement pump for selectively supplying hydraulic fluid through a work implement circuit by the interposition of a pilot operated directional control valve into the steering circuit and/or the work implement circuit. Still another pump is an auxiliary pump for selectively supplying hydraulic fluid through an auxiliary circuit by the interposition of the directional control valve into the steering circuit and/or the work implement circuit. The directional control valve is controlled by a pressure differential across a restrictor provided in the steering circuit.

1 Claim, 2 Drawing Figures

INTEGRATED HYDRAULIC SYSTEM

BACKGROUND OF THE INVENTION

1. Field of the invention:

This invention relates to a hydraulic system, and more particularly to an integrated hydraulic system for use in construction work vehicles such as, for example, tire shovel loaders, dump trucks, motor scrapers etc. The hydraulic system arranged to supply hydraulic fluid delivered by three hydraulic pumps, that is, a pump for supplying hydraulic fluid to operate the steering mechanism, an auxiliary pump and a pump for supplying hydraulic fluid to operate work implements, into steering mechanism operating actuator and work implement operating actuators.

2. Description of the prior art:

Most of the construction work vehicles are provided with a hydraulic system wherein the steering mechanism and the work implements are arranged to be operated, respectively, by separate hydraulic circuit systems independent of each other.

On the other hand, the hydraulic system disclosed in Japanese Patent Laid-Open Publication No. 57-114761 provisionally published on Jul. 16, 1982 comprises a fixed displacement hydraulic pump used exclusively for operating the steering mechanism, a fixed displacement hydraulic pump used exclusively for operating work implements and an auxiliary fixed displacement hydraulic pump, all of which are driven by the propulsion engine mounted on the vehicle, the arrangement being made such that the direction of flow of hydraulic fluid delivered by the three hydraulic pumps can be controlled by a hydraulic circuit having a single pilot operated directional control valve installed therein. For example, when the engine is operating at a low speed near low idling speed, the flow rate of the hydraulic fluid delivered by the pump used exclusively for operating the steering mechanism is less than that required to operate the steering mechanism, and therefore, the hydraulic fluid delivered by the auxiliary hydraulic pump is allowed to join that delivered by the hydraulic pump used exclusively for operating the steering mechanism to thereby supply a required flow rate of hydraulic fluid into the steering mechanism, thus enabling steering operation to be conducted quickly and reliably. Further, when the engine is operating at a high speed, the flow rate of the hydraulic fluid supplied by the hydraulic pump used exclusively for operating the steering mechanism is high enough to operate the steering mechanism, and therefore the hydraulic fluid delivered by the auxiliary hydraulic pump is supplied into work implement operating actuators. Still further, the arrangement is made such that when the engine is operating at a medium speed, the hydraulic fluid delivered by the auxiliary hydraulic pump is supplied or distributed through a restrictor means into the steering mechanism and the work implement operating actuators, respectively. The above-mentioned conventional hydraulic system is however disadvantageous in that, when the engine is rotating at an extremely low speed near low idling speed, in order to supply the sufficient flow rate of hydraulic fluid into the steering mechanism, it is necessary to envisage the increase of the capacity of the steering pump and the auxiliary pump, however in that case it becomes impossible to achieve a major proposition that the power output developed by the engine is utilized effectively for running of the vehicle provided with hydraulic system comprising hydraulic pumps with limited capacities.

Further, disclosed in the U.S. Pat. No. 3,355,994 (issued to Thomas J. Malott) is a hydraulic system arranged to conduct the steering operation and the work implement operation by using three hydraulic pumps driven by an engine. In this hydraulic system, there is also a disadvantage as in the case of the foregoing Japanese Patent Laid-Open Publication No. 57-114761. That is, in order to supply the sufficient flow rate of hydraulic fluid into the steering mechanism so as to effect a preferable steering operation when the engine is operating at an extremely low speed near the low idling speed, it will have to provide a large sized steering pump and a large sized auxiliary pump so as to permit them to increase their respective pump capacities.

SUMMARY OF THE INVENTION

The present invention has been contemplated and devised in view of the above-mentioned circumstances, and has for its object to provide a hydraulic system for vehicles wherein the power output developed by the engine can be utilized effectively for running of the vehicle with hydraulic pumps whose individual capacities are each limited to a required minimum, and even when the engine is running at an extremely low speed near the low idling speed a sufficient flow rate of hydraulic fluid can be supplied into the hydraulic circuit system for operating the steering mechanism thereby enabling a preferable steering operation to be conducted readily and reliably.

To achieve the aforementioned object, according to an aspect of the present invention, there is provided an integrated hydraulic system for a vehicle having a propulsion engine comprising a first fixed displacement hydraulic pump; a steering mechanism hydraulically operating circuit for supplying hydraulic fluid delivered by said first hydraulic pump into a steering mechanism; a second fixed displacement hydraulic pump; a work implement hydraulically operating circuit for selectively supplying hydraulic fluid delivered by said second hydraulic pump through a pilot operated directional control valve into said steering mechanism hydraulically operating circuit and/or said work implement hydraulically operating circuit; a third hydraulic pump serving as an auxiliary pump; an auxiliary hydraulic circuit for selectively supplying the hydraulic fluid delivered by said third hydraulic pump through the pilot operated directional control valve into said steering mechanism hydraulically operating circuit and/or said work implement hydraulically operating circuit; and a restrictor means installed in said steering mechanism hydraulically operating circuit, wherein said pilot operated directional control valve is actuated in such a manner that when the pressure differential across said restrictor means is less than a predetermined minimum value the whole flow rate of the hydraulic fluid delivered by said second hydraulic pump and said auxiliary hydraulic pump is supplied into said steering mechanism hydraulically operating circuit so as to join the flow rate delivered by the first hydraulic pump, wherein when said pressure differential is between the predetermined minimum value and a predetermined maximum value the hydraulic fluid delivered by said second hydraulic pump and said auxiliary hydraulic pump is distributedly supplied into said steering mechanism hydraulically operating circuit and said work implement hydraulically operating circuit, respectively, and wherein when said pressure differential is more than the predetermined maximum value the whole flow rate of the hydraulic fluid delivered by said second, hydraulic pump and said auxiliary hydraulic pump is supplied into said hydraulic circuit for operating the work implement.

BRIEF DESCRIPTION OF THE DRAWINGS

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE PREFERRED EMBODIMENT

The hydraulic system according to the present invention will now be described in more detail below with reference to the accompanying drawings.

Figure 1:
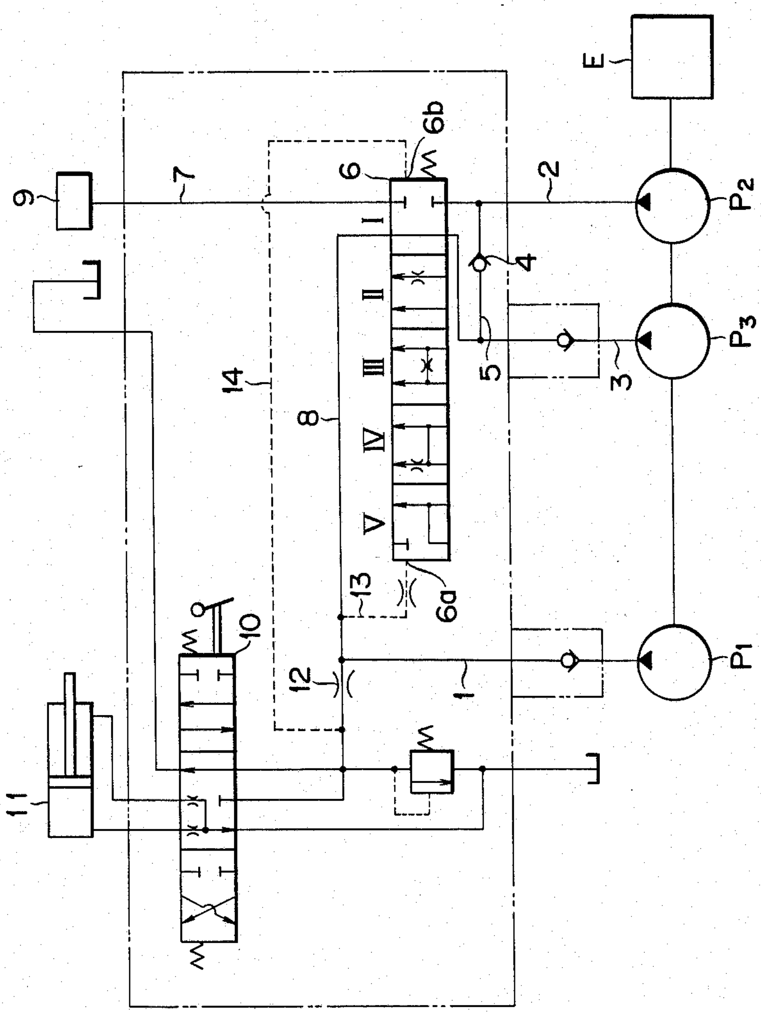
FIG. 1 is a schematic hydraulic circuit diagram including an integrated hydraulic system according to the present invention.

FIG. 1 is a schematic hydraulic circuit diagram showing a first embodiment of integrated hydraulic system according to the present invention.

Referring to FIG. 1, a first fixed displacement hydraulic pump (a steering pump) $P_1$ is connected with a first hydraulic circuit (hydraulic circuit for operating the steering mechanism) 1; a second fixed displacement hydraulic pump (a work implement pump) $P_2$ and a third fixed displacement hydraulic pump (an auxiliary pump) $P_3$ are connected with second and third hydraulic circuits 2 and 3, respectively. The second and third hydraulic circuits 2 and 3 are interconnected by a bypass circuit 5 provided therein with a check valve 4 and are connected through a pilot operated directional control valve (referred to simply as a demand valve hereinbelow) 6 with a part of work implement hydraulically operating circuit (2, 5, 7) and an auxiliary hydraulic circuit (3, 8), respectively. The work implement operating hydraulic circuit 7 is connected with a work implement valve 9, whilst the auxiliary hydraulic circuit (3, 8) is connected with the first hydraulic circuit 1.

The above-mentioned first hydraulic circuit 1 is connected with a steering actuator 11 for operating the steering mechanism through a steering valve 10. The first hydraulic circuit 1 has installed therein a restrictor means 12 whose upstream and downstream pressures are transmitted through first and second pilot circuits 13 and 14 into first and second pressure receiving units **6*a* and 6*b*, respectively, of the demand valve 6**.

The above-mentioned demand valve 6 is arranged such that it is held by a resilient force of a spring at a first valve position I where the second hydraulic circuit 2 is disconnected from the work implement hydraulically operating circuit 7, while the third hydraulic circuit 3 is connected with the auxiliary circuit 8, and when the pressure differential across the restrictor means has reached a predetermined minimum value, it is switched over to a second communicating valve position II where the second hydraulic circuit 2 is allowed to communicate through a restrictor means with the work implenent hydraulically operating circuit 7, while the third hydraulic circuit 3 is directly connected with the auxiliary circuit 8. Further, when the above-mentioned pressure differential is between the predetermined minimum and maximum values, the demand valve 6 is changed over to a third communicating valve position III where the second and third hydraulic circuits 2 and 3 are connected, at the same time, with the work implement hydraulically operating circuit 7 and the auxiliary hydraulic circuit 8, respectively, and then to a fourth communicating valve position IV where the second hydraulic circuit 2 is directly connected with the work implement hydraulically operating circuit 7, whilst the third hydraulic circuit 7 is allowed to communicate through the restrictor means with the auxiliary circuit 8. When the above-mentioned pressure differential becomes more than the predetermined maximum value, the demand valve 6 is changed over to a fifth position V where both the second and third hydraulic circuits 2 and 3 are connected with the work implement hydraulically operating circuit 7.

Thus, when the engine is running at a low speed near low idling speed, that is, the number of revolutions of the engine E is extremely low and therefore that of the pumps are very low, the flow rate of the pressurized fluid through the first hydraulic circuit 1 is very low and the pressure differential across the restrictor means 12 is less than the predetermined minimum value, and as a result, the demand valve 6 is held at the first position I so that the whole flow rate of the fluid under pressure delivered by the work implenent hydraulic pump $P_2$ and the auxiliary hydraulic pump 3 may be supplied into the first hydraulic circuit 1 so as to join the flow rate delivered by the steering pump $P_1$.

Consequently, the whole flow rate of the hydraulic fluid delivered by the three hydraulic pumps $P_1$, $P_2$ and $P_3$ is supplied into the first hydraulic circuit 1 so that the fluid can be supplied into the steering actuator 11 at a sufficient flow rate to thereby enable preferable steering operation to be conducted rapidly and reliably.

Further, when the engine speed is increased to a medium speed, the flow rate of the hydraulic fluid through the first hydraulic circuit 1 is increased correspondingly, and the pressure differential across the restrictor means 12 becomes more than the predetermined minimum value, the demand valve 6 is changed over to the second communicating position II where the hydraulic fluid delivered by the work implement hydraulic pump $P_3$ is supplied into the first hydraulic circuit 1 and the work implement operating hydraulic circuit 7, whilst the hydraulic fluid delivered by the auxiliary pump $P_3$ is supplied into the first hydraulic circuit 1 to make up for the insufficient flow rate of the fluid delivered by the steering pump $P_1$ and is also supplied into the work implement valve 9 connected to work implement operating actuators (not shown).

When the rotating speed of the engine is in increased further in turn, the pressure differential across the restrictor means 12 is increased in turn, the demand valve 6 is changed over in turn to the third and fourth communicating positions III and IV. Thus, the flow rate of the fluid delivered by the work implement pump $P_2$ and the auxiliary pump $P_3$ into the first hydraulic circuit is reduced in turn, whilst that of the hydraulic fluid supplied into the work implement valve 9 is increased in turn.

Further, when the engine is rotating at a high speed, the flow rate of the fluid through the first hydraulic circuit 1 is increased beyond the quantity required for the steering mechanism operating actuator 11 and the pressure differential across the restrictor means 12 becomes more than the predetermined maximum value, and as a result, the demand valve 6 will occupy its fifth position V so that the whole flow rate of the hydraulic fluid delivered by both the work implement hydraulic pump $P_2$ and the auxiliary hydraulic pump $P_3$ can be supplied into the work implement hydraulically operating circuit 7.

Figure 2:
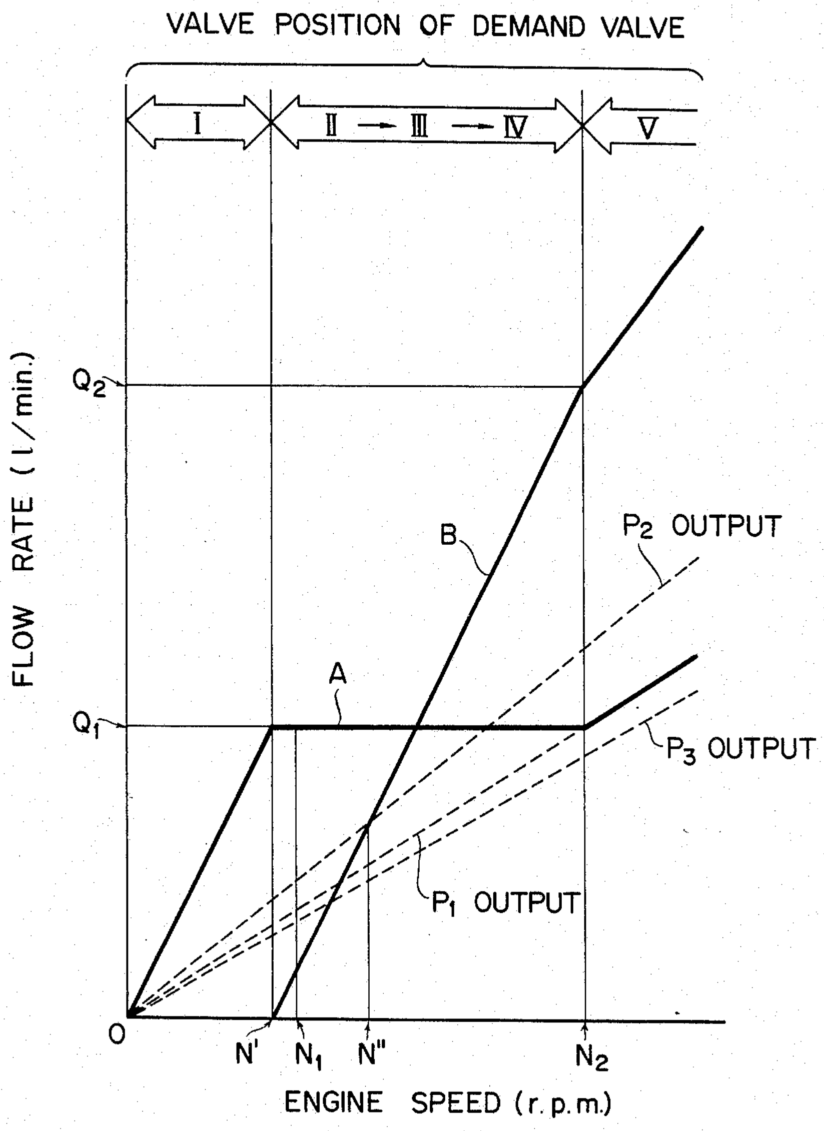
FIG. 2 is a graph showing the flow rate characteristics relative to the number of revolutions of the engine in the integrated hydraulic system shown in FIG. 1.

The flow rates thus obtained in the above-mentioned operating conditions are graphically shown in FIG. 2, where reference character A denotes the flow rate of hydraulic fluid through the steering circuit, and B represents that through the work implement circuit. Reference character $N_1$ denotes the low idling speed of the engine E where the steering mechanism requires the flow rate $Q_1$ for its preferable operation. When the engine speed is in the range from 0 to N', the whole flow rate delivered from three pumps $P_1$, $P_2$ and $P_3$ is directed to the steering circuit. At that time, the demand valve 6 is occupied in the first position I. When the engine speed is accelerated in the range from N' to $N_2$, the flow rate supplied into the steering circuit is kept to $Q_1$, while the hydraulic fluid supply to the work implement circuit is commenced at N' by a part of the output of the second pump $P_2$ and thereafter the hydraulic fluid supply thereto is successively increased by the outputs of the second and the third pumps $P_2$ and $P_3$ to the flow rate $Q_2$ at the time when the engine speed is accelerated at $N_2$. In the engine speed range from N' to $N_2$, the valve position of the demand valve 6 is switched, in turn, from II to IV. When the engine speed is accelerated more than $N_2$, the hydraulic fluid supply to the steering circuit is increased in proportion to the output of the first pump $P_1$ only, while that to the work implement circuit is increased by the sum of the outputs of the second and the third pumps $P_2$ and $P_3$. At that time, the demand valve 6 is occupied in the position V.

It is to be understood that the foregoing description is merely illustrative of a preferred embodiment of the invention, and that the invention is not to be limited thereto, but is to be determined by the scope of the appended claims.

What we claim is:

1. An integrated hydraulic system for a vehicle having a propulsion engine comprising a first fixed capacity or displacement hydraulic pump; a steering mechanism hydraulically operating circuit for supplying the hydraulic fluid delivered by said first hydraulic pump into a steering mechanism; a second fixed capacity or displacement hydraulic pump; a work implement hydraulically operating circuit for selectively supplying the hydraulic fluid delivered by said second hydraulic pump through a pilot operated directional control valve into said steering mechanism hydraulically operating circuit and/or said work implement hydraulically operating circuit; a third hydraulic pump serving as an auxiliary pump; an auxiliary hydraulic circuit for selectively supplying the hydraulic fluid delivered by said third hydraulic pump through the pilot operated directional control valve into said steering mechanism hydraulically operating circuit and/or said work implement hydraulically operating circuit; and a restrictor means installed in said steering mechanism hydraulically operating circuit, wherein said pilot operated directional control valve is actuated in such a manner that when the pressure differential across said restrictor means is less than a predetermined minimum value the whole quantity of the hydraulic fluid delivered by said second hydraulic pump and said auxiliary hydraulic pump is supplied into said steering mechanism hydraulically operating circuit so as to join the flow rate delivered by the first hydraulic pump, and wherein said pressure differential is between the predetermined minimum value and a predetermined maximum value the hydraulic fluid delivered by said second hydraulic pump and said auxiliary hydraulic pump is distributedly supplied into said steering mechanism hydraulically operating circuit and said work implement hydraulically operating circuit, respectively, and wherein when said pressure differential is more than the predetermined maximum value the whole flow rate of the hydraulic fluid delivered by said second hydraulic pump and said auxiliary hydraulic pump is supplied into said work implement hydraulically operating circuit.

* * * * *